Nov. 15, 1960      H. E. EDGERTON      2,960,380
FLASH-PHOTOGRAPHY APPARATUS AND METHOD
Filed May 31, 1957      3 Sheets-Sheet 1

INVENTOR.
HAROLD E. EDGERTON
BY Rines and Rines
ATTORNEYS

Nov. 15, 1960 H. E. EDGERTON 2,960,380
FLASH-PHOTOGRAPHY APPARATUS AND METHOD
Filed May 31, 1957 3 Sheets-Sheet 2

INVENTOR.
HAROLD E. EDGERTON
BY Rines and Rines
ATTORNEYS

Nov. 15, 1960　　　　　H. E. EDGERTON　　　　2,960,380
FLASH-PHOTOGRAPHY APPARATUS AND METHOD
Filed May 31, 1957　　　　　　　　　3 Sheets-Sheet 3

INVENTOR.
HAROLD E. EDGERTON
Rines and Rines
ATTORNEYS

United States Patent Office 2,960,380
Patented Nov. 15, 1960

2,960,380

FLASH-PHOTOGRAPHY APPARATUS AND METHOD

Harold E. Edgerton, Belmont, Mass., assignor to Edgerton, Germeshausen & Grier, Inc., Boston, Mass., a corporation of Massachusetts Filed May 31, 1957, Ser. No. 662,689

10 Claims. (Cl. 346—107)

The present invention relates to flash-photography apparatus and methods and, more particularly, to such apparatus and methods that are designed to permit the indicating or recording of phenomena that modify the properties of air or other media.

There are numerous occasions when it is desired to indicate or record the effect of physical phenomena upon various media. Where the effect of various obstacles upon the flow of a fluid medium is to be determined, or where shock waves produced by an explosive process are to be indicated, as typical examples, the schlieren technique is usually employed. In accordance with this and similar indicating or recording techniques, however, it is necessary to block off substantially all light from the vicinity of the phenomenon-to-be-studied, and to indicate only those rays of light that are caused to have their paths deviated by changes in the refractive-index properties of the medium produced by the presence of the obstacle or by the explosion or other phenomenon.

A second technique for recording the shock waves is the direct shadow method which has been extensively used for photographing bullets and the disturbances in the air caused by the motion of the bullets. The shadow method requires that the film be full scale. This technique can only be used in practice, therefore, with small subjects. The recording, furthermore, must be done in the dark since a relatively long time is required to uncover a large piece of film for exposure.

Prior-art techniques of these types, therefore, are decidedly limited in their application to relatively small-scale models of the apparatus to be studied. The optical requirements, moreover, restrict not only the size of the apparatus that can be tested, but the place where the test can be carried out. Explosives, for example, are therefore tested for shock-wave characteristics only by means of small sample explosive devices. Air-flow characteristics are also measured in test chambers and the like. It would be very desirable, however, to be able to indicate or record such characteristics with full-scale models and, moreover, in actual daylight.

An object of the present invention, accordingly, is to provide a novel method for the indication or recording of such phenomena with full-scale apparatus; and, if desired, in broad daylight or in the presence of other illumination such as the light from the subject.

A further object is to provide a new and improved apparatus for flash-photography and the like that permits of these results.

A further object is to exploit the advantages of the shadow technique for large scale explosions or phenomena.

An additional object is to utilize a fast shutter with electronic timing techniques which enables the exclusion of ordinary unwanted light but which operates at the desired moment of interest.

Other and further objects will be explained hereinafter and will be more particularly pointed out in the appended claims.

In summary, from perhaps its broadest viewpoint, the present invention contemplates the transmission of a flash of electromagnetic energy, such as light, through the proximity of the object where shock-wave or other phenomena occur. The refraction pattern produced by this flash of light being transmitted through the said proximity is then preferably shadowed on a reflecting background and subsequently focused upon a film or other indicating surface by a camera. The object itself is exposed to the film also but may be somewhat out of focus since the lens is adjusted to give a sharp image of the shadow on the screen. Preferred techniques and details are hereinafter presented.

The invention will now be described in connection with the accompanying drawing, Fig. 1 of which is a schematic diagram illustrating the invention as applied to the photographing of shock-wave phenomena associated with explosive objects;

Figure 1:
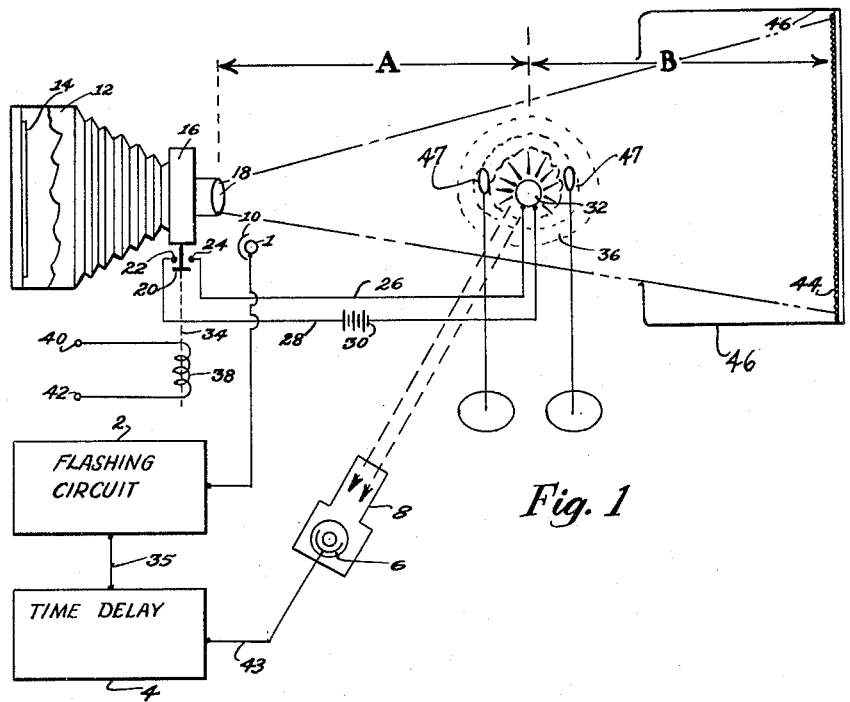

Referring to Fig. 1, an explodable object 32 is shown ignitible by the passing of an electric impulse to input terminals 40 and 42 associated with a shutter operating relay 38. The armature 34 of the relay 38 may then move upwardly to trigger the shutter. A synchronizing contactor member 20 on the shutter then connects together a pair of normally unconnected contact terminals 22 and 24. An electric circuit is thereby completed, traceable by way of conductor 26 to the object 32, then by a further conductor 28 through an ignition battery or other source 30 that serves to energize and hence explode the object 32. Substantially simultaneously or synchronously with the closing of the contacts 22 and 24 by the upward movement of the armature contact member 20, the shutter 16 of, for example, a conventional bellows or other type camera 12, is opened. The explodable object 32 is thus exposed to a film or other electromagnetic-wave-sensitive surface 14 at the moment of action. In accordance with the present invention, the object 32 may not be focused upon the film 14, but it is preferably merely exposed to the film for reasons that will hereinafter be explained. The illumination or some other phenomenon associated with the explosion of the object 32 is monitored as, for example, by a photocell monitor 6, shielded within a container 8 and which, in turn, is connected by a conductor 43 to a time-delay device or network 4, and thence by a conductor 35 to a light-flash-producing circuit 2 for operating a flash lamp or flash device 1. The flashing circuit 2 may, for example, be of the form described in my prior United States Letters Patents 2,408,764, issued October 8, 1946, and 2,478,901, issued August 16, 1949, or in United States Letters Patent No. 2,755,714, issued July 24, 1956 to Kenneth J. Germeshausen. It may also assume the form hereinafter described in connection with Fig. 2, or any other suitable form.

A predetermined interval of time after the explosion of the object 32, the photocell 6, which has monitored the radiation or illumination produced by the object 32, will energize the flashing circuit 2 through the time-delay device 4. The time delay is selected such that the shock wave 36, or other phenomenon that it is desired to photograph, will have progressed to a certain predetermined distance from the explodable object 32 at which it is desired to photograph, record or indicate the shock-wave pattern. There will thus be produced at such a predetermined instant of time after the explosion of the object 32, a flash of light from the flash-lamp or device 1 that is directed through the shock-wave region 36 in the proximity of the object 32 away from the camera 12. In order to keep the illumination produced by the flash-device 1 from directly recording upon the film 14, a shield 10, such as a concave reflector, may be provided. This transmitted flash of light is reflected back toward the camera 12 by a reflecting screen or surface 44, preferably of the beaded type, marketed under the trade-mark "Scotchlite," or of other types. The air refractive index at the region 36 has, of course, been altered by the shock wave so that refractive effects are produced upon the light transmitted from the flash device 1. The resulting refraction pattern is thus shadowed on the screen 44 by the light from the small lamp 1. That shadowed refraction pattern is preferably focused by the lens 18 upon the film 14. There will thus be impressed upon the film 14 an out-of-focus image of the explodable object 32 and a relatively well-focused image of the shock-wave-produced refraction shadow pattern which it is desired to study.

The flash-lamp or device 1 is preferably disposed close to, though out of the field of, the camera lens 18. Since the refraction effect is largest when the distance A between the object 32 and the source of light 1 is made as small as possible, it is desirable to locate the object 32 as close to the lamp 1 as feasible. Though the flash-lamp 1 may be of very small dimensions, however, as disclosed, for example, in my co-pending application, Serial No. 588,906, filed June 1, 1956 for Flash Tube and Apparatus, now matured into United States Letters Patent No. 2,919,369, issued December 29, 1959, it is, none-the-less, not a point source of illumination, but a source of finite size, so that this factor has a practical effect upon the location of the lamp. From the practical point of view, moreover, an explodable object 32 can not be located very close to the flash-lamp 1 without damaging the same.

Figure 3:
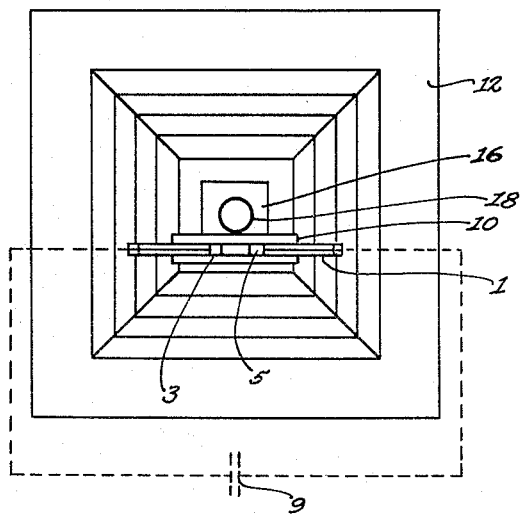
Figs. 4 and 3 are, respectively, side and front elevations illustrating modified flash lamp positions.
Figure 4:
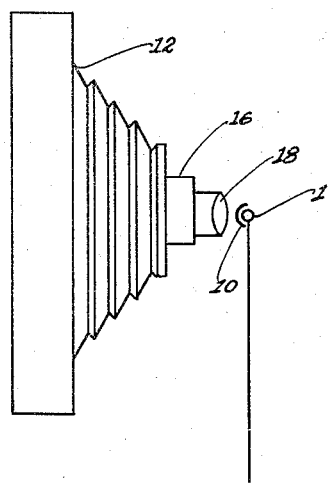

The shadow and the subject can actually be superimposed if the lamp is placed directly in front of the center of the lens, Fig. 4. This is the preferred position for many uses but not often the most convenient. Usually, the lamp is placed just off the lens axis, as shown in Figs. 1 and 3, so that it does not eclipse the lens opening.

Figure 5:
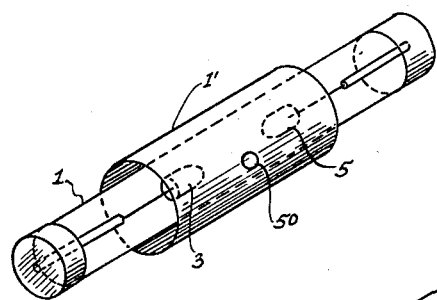
Figs. 5, 6 and 7 are perspective views of modified flash-tubes particularly suited to the purposes of the present invention.
Figure 6:
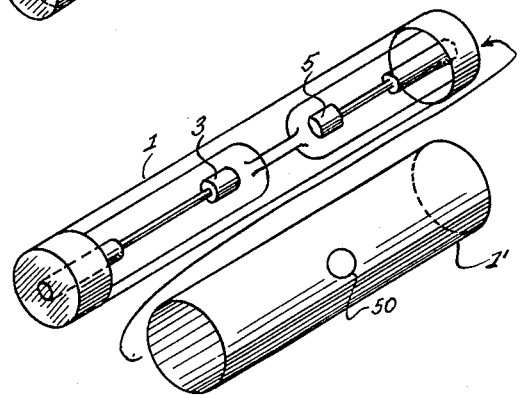
Figure 7:
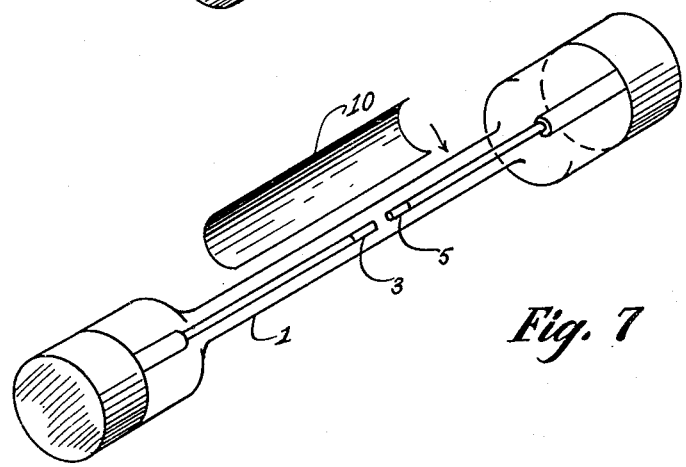

Every effort is made in this lamp to get a small intense source since the resolution of the shadow on the screen depends upon the smallness of the source. The lamp size can be effectively reduced by the use of a light-absorbing cylinder 1', Figs. 5 and 6, with a small hole 50 positioned to limit the light from the discharge space between the electrodes 3 and 5 of the flashtube. In Fig. 6, the discharge space is shown constricted by a reduction in envelope size. Alternately, or supplementarily, a small high-pressure flashlamp having electrodes spaced by a small distance in the flashtube, Fig. 7, may be employed, having a large energy flash per unit volume to produce a brilliant spot of light, as described, for example, in my said co-pending application, Serial No. 588,906, filed June 1, 1956, for Flash Tube and Apparatus now United States Letters Patent No. 2,919,369, and in United States Letters Patent No. 2,756,361 issued July 24, 1956, to Kenneth J. Germeshausen.

It has been found that, in view of this optical system, wherein the refractive pattern is impressed upon the screen solely from light transmitted by the high-intensity flash of the flash-lamp 1, the apparatus may be used even in broad daylight. In order to keep the direct sunlight from the screen 44, however, it may be desirable to provide a shield 46. The camera shutter speed, however, may need to be fast to exclude the daylight exposure. A shutter 16 of the magneto optic or Kerr-cell type may be required for some subjects and conditions. Actual shock-wave patterns have thus been photographed in sunlight. More than this, since there is, in practice, no limit to the size that one can make a relatively inexpensive reflecting screen 44, which, indeed, may even be expendible, the present invention may be employed with full-scale explodable or other objects 32.

As before stated, the screen 44 is preferably of the "Scotchlite" variety which reflects most of the light back in the direction of the light source 1. In this way, high directive efficiency is obtained so that a weaker flash lamp 1 is required. Some subjects, furthermore, produce an intense flash of light which may produce an undesired effect on the film and screen. This can be eliminated by the use of expendible light absorbing screens, 47, as shown in Fig. 1.

Figure 2:
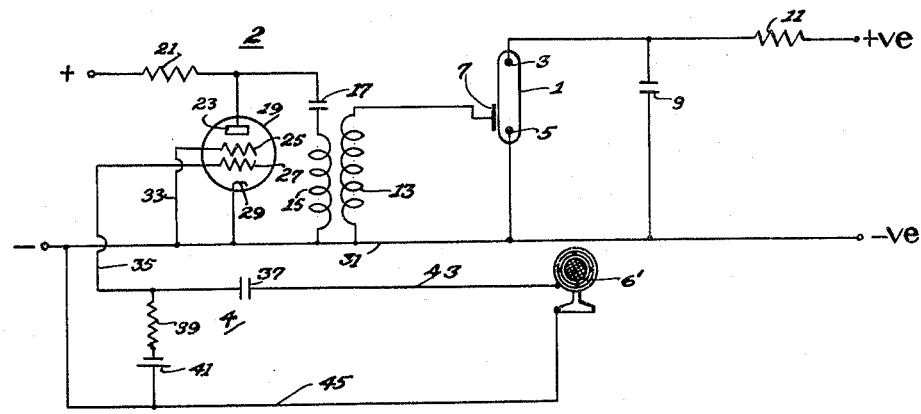
Fig. 2 is a circuit diagram of a preferred apparatus for use in the system of Fig. 1 using a different flash triggering system.

As an illustration, the flash device 1 may be an xenon-filled flash lamp four millimeters in inner diameter and operated at one atmosphere. Other lamps of 1 mm. diameter and 4 mm. gap lengths have been employed. The pair of principal electrodes 3 and 5 therein may be spaced one-half an inch, more or less. The lamp, as shown in Fig. 2, employs, also, an external trigger electrode 7. A storage capacitor 9, chargeable through an impedance 11 from a high-voltage source $+ve$, $-ve$, applies high voltage to the principal electrodes 3 and 5 of the tube 1, but insufficient voltage to permit of a discharge between the electrodes 3 and 5 in the absence of energization of the trigger electrode 7. When the trigger electrode 7 is energized with a voltage impulse from the secondary winding 13 of a trigger transformer 15, 13, however, the capacitor 9 discharges its stored energy between the principal electrodes 3 and 5 of the flash lamp 1, producing a high-intensity brief flash of light. In order to demonstrate that the system of Fig. 1 may operate not only by monitoring the illumination produced by the explosion of the object 32, as by the photocell 6, but may be controlled, also, by the sound of the explosion, a microphone monitor 6' is illustrated in Fig. 2 instead of the photo-cell 6 of Fig. 1. Conductors 43 and 45 connect the monitoring microphone 6' to the electronic triggering device 2. The capacitor 37 is shown connected in series with the conductor 43 and the resistor 39 is connected in shunt through a bias battery 41.

The condenser 37 is connected, in turn, by way of a further conductor 35 to the control-grid electrode 27 of a trigger or switching tube 19, shown as of the preferred thyratron or other gaseous-discharge type. The cathode 29 of the tube 19 is connected to the terminal $-ve$ which may, if desired, be grounded, and the anode or plate 23 thereof connects through an impedance 21 to a positive voltage terminal, labelled $+$. The screen-grid 25 of the trigger tube 19 is shown connected by conductor 33 to the negative terminal $-ve$. The bias voltage of the before-mentioned battery 41 serves to maintain the control electrode 27 of the trigger tube 19 negative with respect to the cathode 29 so that the tube 19 can not conduct. The position of the microphone 6' determines the instant that the photograph is taken since there is no disturbance until the shock wave reaches the microphone. Voltage resulting from sound received by the microphone 6' will exceed the critical bias voltage 41 so as to render the control electrode 27 sufficiently positive to enable the trigger tube 19 to conduct. A further capacitor 17, normally charged from the voltage terminals $+$, $-$ through the impedance 21 and through the primary winding 15 of the trigger transformer 15, 13, will thereupon discharge through the trigger tube 19, between its cathode 29 and anode 23. This discharge produces the trigger impulse that, as before stated, becomes impressed upon the trigger transformer secondary winding 13, thereby energizing the trigger electrode 7 and initiating the discharge of the flash capacitor 9 between the principal electrodes 3 and 5 of the flashtube 1 to produce a flash of light.

With the before-mentioned one-half inch xenon-gap flash-lamp and a voltage $+ve$, $-ve$ of 2,000 volts for charging a flash-capacitor 9 of about 1.25 microfarads, explosive objects have been successfully photographed with the arrangement of Figs. 1 and 2. With the distance A approximately equal to the distance B, firecracker shock-waves eight-inches in diameter have been successfully photographed in broad daylight with the screen shielded from direct sunlight.

While the invention has heretofore been described in connection with the measurement of shock-wave phenomena associated with an eplodable object, it is, of course, to be understood that it is of broader utility. As previously indicated, there are other types of phenomena that alter the refractive-index and other properties of media and that are susceptible to study by the techniques herein disclosed. While, moreover, photographing has been illustrated, it is also to be understood that other indicating or recording processes may be employed, such as, for example, phosphor screens or other types of indicating surfaces. It is not, moreover, to be considered that the invention is limited to the production of a single light flash or to a stationary recording or indicating surface. Repetitive trigger impulses may be employed as may moving-picture recording techniques, as described in my prior United States Letters Patent No. 2,186,013, issued January 9, 1940 and in my copending application, Serial No. 309,307, filed September 12, 1952 for Multiple Light-Flash-Producing System, U.S. Letters Patent No. 2,781,707, issued February 19, 1957. Successive positions of the shock-wave or other phenomena may thus be photographed or recorded, if desired.

Further modifications will occur to those skilled in the art and all such are considered to fall within the spirit and scope of the invention, as defined in the appended claims.

What is claimed is:

1. Apparatus for indicating the presence of an object adapted to radiate electromagnetic waves in a medium together with phenomena occurring in the proximity of the object that produce refractive index variations in the medium, that comprises means for exposing the object to an electromagnetic-wave-sensitive surface, means for monitoring the electromagnetic waves for a predetermined interval of time, means for thereupon transmitting a flash of electromagnetic-wave energy in a direction away from the said surface and through the said proximity of the object, means for reflecting the transmitted flash of energy after its transmission through the said proximity back toward the said surface, and means for focusing the reflected flash of energy upon the said surface.

2. Apparatus for indicating the presence of an explodable object in a medium together with phenomena occurring in the proximity of the object upon its explosion that produce refractive index variations in the medium, that comprises, means for exploding the object, means for exposing the exploded object to an electromagnetic-wave-sensitive surface, means for monitoring the explosion for a predetermined interval of time, means for thereupon transmitting a flash of electromagnetic-wave energy in a direction away from the said surface and through the said proximity of the object, means for reflecting the transmitted flash of energy after its transmission through the said proximity back toward the said surface, and means for focusing the reflected flash of energy upon the said surface.

3. Apparatus for photographing an object adapted to radiate light waves in a medium together with phenomena occurring in the proximity of the object that produce refractive index variations in the medium, that comprises, means for exposing the object to a light-sensitive surface, means for monitoring the light waves for a predetermined interval of time, means for thereupon transmitting a flash of light in a direction away from the said surface and through the said proximity of the object, means for reflecting the transmitted flash of light after its transmission through the said proximity back toward the said surface, and means for focusing the reflected flash of light upon the said surface.

4. Apparatus for photographing an explodable object in a medium together with shock-wave phenomena occurring in the proximity of the object upon its explosion that produce refractive index variations in the medium, that comprises, means for exploding the object, means for exposing the exploding object to a light-sensitive surface, means for monitoring the explosion for a predetermined interval of time sufficient to permit the shock wave to travel a predetermined distance from the object, means for thereupon transmitting a flash of light in a direction away from the said surface and through the said proximity of the object, means for reflecting the transmitted flash of light after its transmission through the said proximity back toward the said surface, and means for focusing the reflected flash of light upon the said surface.

5. Apparatus for photographing an explodable object in a medium together with shock-wave phenomena occurring in the proximity of the object upon its explosion that produce refractive index variations in the medium, that comprises, means for exploding the object, means for exposing the exploding object to a light-sensitive surface, means for monitoring the explosion for a predetermined interval of time sufficient to permit the shock wave to travel a predetermined distance from the object, means for thereupon transmitting successive flashes of light in a direction away from the said surface and through the said proximity of the object, means for reflecting the transmitted flashes of light after their transmission through the said proximity back toward the said surface, and means for focusing the reflected flashes of light upon the said surface.

6. In apparatus for photographing upon a film an explodable object together with shock-wave phenomena occurring in the proximity of the object upon its explosion that produce refractive-index variations in the medium surrounding the object, the combination of means for monitoring the explosion of the object, a light-flash-producing circuit, means responsive to the monitoring means for operating the flash-producing circuit to transmit through the said proximity a flash of light after the lapse of a predetermined time interval during which the shock wave may travel a predetermined distance from the object, means for reflecting toward the film the refractive-pattern resulting from the said transmission of the flash of light through the said proximity, and means for exposing the film to the exploding object and for focusing the reflected refractive-pattern upon the film.

7. Apparatus as claimed in claim 6 and in which means is provided for shielding the film from the direct radiation of the said flash of light.

8. Apparatus as claimed in claim 6 and in which the reflecting means comprises a screen of reflecting beads.

9. Apparatus as claimed in claim 6 and in which means is provided for operating the exposing means substantially synchronously with the exploding of the object.

10. In apparatus for photographing upon a film an object adapted to radiate light waves together with phenomena occurring in the proximity of the object that produce refractive-index variations in the medium surrounding the object, the combination of means for monitoring the light waves from the object, a light-flash-producing circuit, means responsive to the monitoring means for operating the flash-producing circuit to transmit through the said proximity a flash of light after the lapse of a predetermined time interval, means for reflecting toward the film the refractive-pattern resulting from the said transmission of the flash of light through the said proximity, and means for exposing the film to the object and for focusing the reflected refractive-pattern upon the film.

References Cited in the file of this patent

UNITED STATES PATENTS

| | | |
|---|---|---|
| 1,044,835 | Wattles | Nov. 19, 1912 |
| 2,026,500 | Hutchings | Dec. 31, 1935 |
| 2,160,006 | Thompson et al. | May 30, 1939 |
| 2,362,235 | Barnes | Nov. 7, 1944 |
| 2,382,617 | Del Riccio | Aug. 14, 1945 |
| 2,382,981 | Edgerton | Aug. 21, 1945 |
| 2,653,073 | Messerly et al. | Sept. 22, 1953 |
| 2,727,427 | Jenkins | Dec. 20, 1955 |
| 2,773,732 | Roberts et al. | Dec. 11, 1956 |